J. M. WEBB.
Cooking-Utensil.
No. 225,188. Patented Mar. 2, 1880.
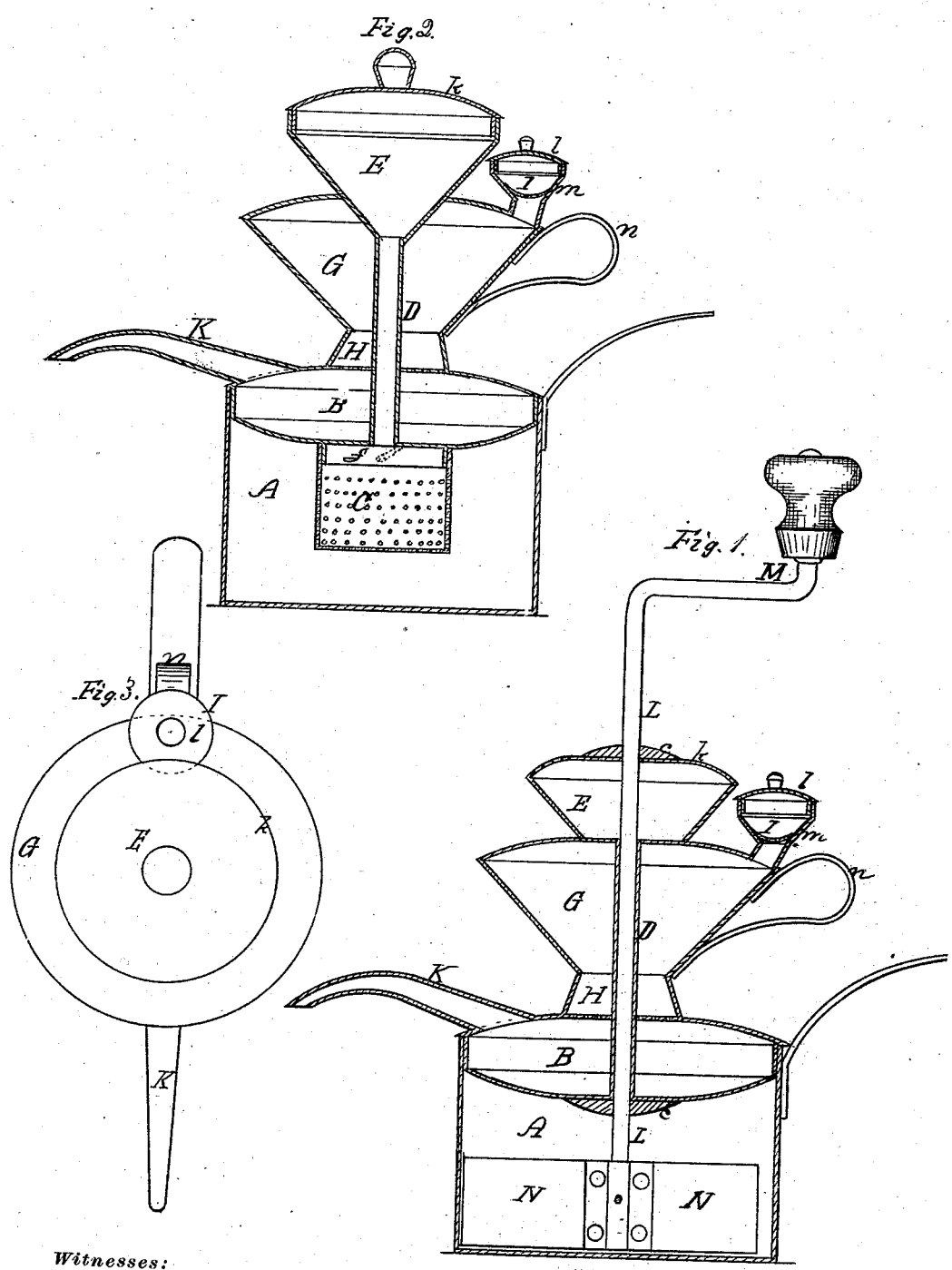
Witnesses:
Inventor:
Jacob M. Webb,
By J. S. Brown,
his attorney.

UNITED STATES PATENT OFFICE.

JACOB M. WEBB, OF SOMERVILLE, TENNESSEE.

COOKING UTENSIL.

SPECIFICATION forming part of Letters Patent No. 225,188, dated March 2, 1880.

Application filed November 13, 1879.

*To all whom it may concern:*

Be it known that I, JACOB M. WEBB, of Somerville, in the county of Fayette and State of Tennessee, have invented an Improved Coffee-Roaster and Cooking Utensil; and I do hereby declare that the following is a full and exact description thereof, reference being had to the accompanying drawings, making part of this specification—

Figure 1 being a central vertical section of the apparatus complete; Fig. 2, a corresponding section of the apparatus with the agitator or stirrer removed; Fig. 3, a top view of the same as shown in Fig. 2.

Like letters designate corresponding parts in all of the figures.

My invention consists in the combination of a condenser, through which cool water is caused to continually flow, and a mechanical stirrer or agitator, for the purpose of roasting coffee and various applications in cooking, whereby the steam and odors of the coffee or victuals are continually condensed and retained, and at the same time the coffee or viands may be stirred or agitated at will without removing the condenser, or any inconvenience arising in the use of the said condenser.

In Letters Patent No. 221,376, dated November 4, 1879, granted to me for an improved apparatus for making coffee and tea, I have described and claimed an improved perpetual condenser for the steam and aroma of the coffee and tea, the same being provided with facilities for introducing hot water or any liquids into the body of the apparatus; also with a "dripper," or perforated apparatus to contain the ground coffee or tea leaves, combined with the condenser. The said condenser and dripper, or a condenser and dripper constructed and operating in a similar manner, only properly varied in form and increased in size to suit the new purpose now contemplated, will serve for the present invention, and are claimed by me under the said Letters Patent.

I will now proceed to describe the same as applied to roasting coffee and cooking victuals, and the mode of constructing and combining therewith my mechanical stirrer or agitator.

In the drawings, A is intended to represent any suitable or any desired construction of vessel in which to roast coffee or cook viands or victuals by steaming, boiling, roasting, broiling, frying, or even baking; and my improved condenser is to be so formed, whether cylindrical or otherwise, as to fit over the top of the vessel closely as a cover.

The condenser, as represented in the drawings, consists, mainly, of a close vessel, B, of the proper size or diameter to fit as a cover over or into the top of the vessel A. It is to be made comparatively shallow, as indicated in the drawings, so as not to contain a large quantity of water at once, since it is to be kept supplied with cold or cool water proper for readily condensing steam and aromatic volatile vapors. This is to be kept supplied with cold or cool water; and in order that the water may not become heated or warmed, it is necessary that water shall be continually drawn from it, because of the heating effects of the hot steam and vapors rising from the roaster or cooking-vessel below. For this purpose a drawing-off spout, K, leads from the vessel B, and extends outward, so as to conveniently discharge the water into a dish or receiver set to catch the water. The discharge-aperture of the spout is quite small, as indicated, so that no more water shall run out than is necessary to keep the water sufficiently cool in the condensing vessel or chamber B.

The cold water is introduced into the condensing-vessel B through a funnel or receiving-vessel, I, and I prefer to introduce the water therefrom first into a chamber or compartment, G, above the condensing vessel or chamber B, with which it communicates by a narrow passage, H, and thus a supply of cold or cool water is kept to replenish the vessel or chamber B as fast as the spout K draws off the warmed water. If more water is required than the chamber G contains during the roasting or cooking, then more is to be supplied from time to time through the funnel I.

The water in the chamber G also serves to keep cool the vertical tube or passage D, which extends down through it, and in which the shaft L or any agitator or stirrer N is inserted. This agitator, combined with the above-described condenser or its equivalent, may be constructed conveniently as shown in Fig. 1, which is the substantial construction I have adopted for a coffee-roaster. It consists of wings N N, attached to the lower end of the shaft L, that is mounted to turn in the aforesaid tube D of the condenser. The upper projecting end of the shaft terminates with a suitable handle or crank, M, by which to turn or otherwise move the agitator. The wings N N are caused thereby to revolve or move just over the bottom of the roasting or cooking vessel A, the shaft being lowered till it nearly or quite rests on the bottom of the vessel.

Where the shaft L passes through the top and bottom of the condenser there may be a suitable re-enforcement, c, to give proper strength to hold the agitator; but this is only necessary for some purposes. The upper bearing, c, may be in the cover of a funnel, E, which I usually locate above the chamber G, to communicate with the tube D, through which I introduce water or other liquids when the shaft of the agitator is removed.

Since for cooking some things an agitator is not required, the agitator is generally made removable, and this can be conveniently provided for with the construction shown in Fig. 1 by having the wings N N detachable from the shaft L, which can then be drawn up through the tube D. In Figs. 2 and 3 I show the condenser and cooking-vessel with the agitator removed and the perforated cover k of the funnel E used with the agitator replaced by a close cover. I also show in Fig. 2 my dripper C perforated at the sides and bottom, to hold rice or other vegetables for steaming or boiling, these articles not requiring an agitator or stirrer. I also show a flange, f, projecting downward from the bottom of the condenser, by which to removably attach the dripper C, that slips on around the flange, and is held there by any suitable fastening. I prefer to attach this flange to all my condensers, though I have not shown it in Fig. 1.

With this condenser not only do I condense and retain the volatilized aroma of roasting coffee and certain articles while cooking them, but save a good deal of heat by preventing its escape with the steam and vapors generated in cooking. At the same time I furnish improved facilities for stirring the articles while roasting or cooking them, and render the process more comfortable to the attendant by furnishing a cool shield against the radiation of heat from the cooking-vessel.

What I claim as my invention, and desire to secure by Letters Patent, is—

In a coffee-roaster or cooking utensil, the combination of a condenser provided with means, substantially as described, for producing a continual circulation of cool water, and an agitator or stirrer, substantially as and for the purpose herein specified.

The foregoing specification signed this 18th day of June, 1879.

JACOB M. WEBB.

Witnesses:
WM. C. OLD,
JULIUS C. SCHLOSS.